Aug. 22, 1967     M. D. GILL     3,337,802
WATTHOUR METER CASING HAVING MOISTURE TRANSMITTING
VENT AT ITS LOWEST PORTION
Original Filed July 20, 1962

WITNESSES:
Bernard R. Griegner
James F. Young

INVENTOR
Merrion D. Gill
BY C. L. Freedman
ATTORNEY

United States Patent Office 3,337,802
Patented Aug. 22, 1967

3,337,802
WATTHOUR METER CASING HAVING MOISTURE TRANSMITTING VENT AT ITS LOWEST PORTION
Merrion D. Gill, Raleigh, N.C., assignor to Westinghouse Electric Corporation, Pittsburgh, Pa., a corporation of Pennsylvania
Continuation of application Ser. No. 211,279, July 20, 1962. This application Mar. 7, 1966, Ser. No. 536,549
5 Claims. (Cl. 324—156)

ABSTRACT OF THE DISCLOSURE

A watthour meter is provided with a casing sealed against entry of particles but permitting moisture discharge and breathing.

---

This patent application is a continuation of my copending patent application, Ser. No. 211,279, filed July 20, 1962, now abandoned, under the same title.

This invention relates to electrical measuring devices and it has particular relation to watthour meters suitable for outdoor mounting.

Electrical measuring devices, such as watthour meters, which are designed for outdoor mounting generally employ a container or casing within which the watthour meter is located. Openings conventionally are provided in the container to establish breathing or air communication between the interior and exterior of the container.

In accordance with the invention a watthour meter is provided with a container which is substantially sealed against the transmission of deleterious material such as dust and insects between the exterior and interior of the container. The container is provided with a moisture discharging device which is located at the lowest level of the container. Although the device provides a path for discharging moisture from the interior to the exterior of the container, it is designed to provide an effective barrier against the transmission of the aforesaid deleterious material.

It is, therefore, an object of the invention to provide a watthour meter assembly which includes a container for a watthour meter provided with an improved moisture discharging device.

It is also an object of the invention to provide a watthour meter assembly which includes a container for a watthour meter wherein the container effectively seals its contents against the entry of deleterious material.

Other objects of the invention will be apparent from the following description taken in conjunction with the accompanying drawing, in which.

Figure 1:
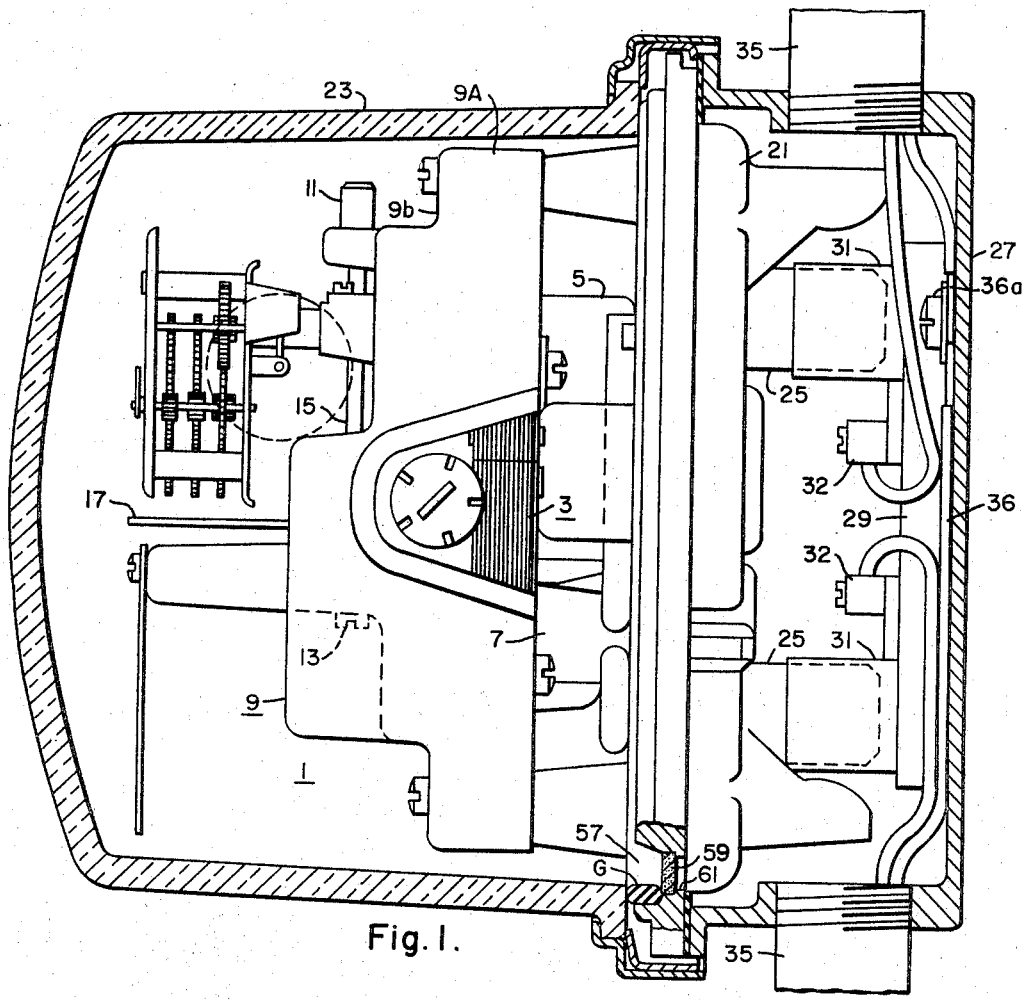
FIGURE 1 is a view in elevation with parts broken away of a watthour meter assembly embodying the invention.

Referring to FIG. 1 of the drawing, a watthour meter 1 is illustrated which includes an electromagnet 3. The electromagnet has voltage winding means 5 and current winding means 7 which when energized produce a shifting magnetic field.

The electromagnet 3 is mounted in a frame 9 which is constructed of a non-magnetic electroconductive material such as an aluminum die casting alloy. This frame provides a rim portion 9a which substantially surrounds the periphery of the electromagnet 3. In addition, the frame has a front portion 9b which extends substantially over the front of the electromagnet 3.

Other components of the watthour meter are supported by the frame 9. Thus, the frame has bearing units 11 and 13 which rotatably receive a shaft 15 to mount the shaft for rotation relative to the electromagnet 3. This shaft supports an electroconductive disc or armature 17 which has a portion located in the shifting magnetic field provided by the electromagnet 3. Conventional damping magnets (not shown) are secured to the frame 9 to provide a magnetic field through which a portion of the armature 17 rotates. As well understood in the art when the electromagnet 3 is suitably energized the armature 17 rotates at a rate dependent on the electrical energy supplied by an electrical circuit from which the electromagnet 3 is energized. The rotation of the shaft 15 is counted or registered by means of a conventional register 19.

The watthour meter 1 is mounted on a suitable base 21 which conventionally may be constructed of an insulating material such as a phenolic resin. The watthour meter 1 is located within a container or casing formed by the base 21 and a cup-shaped glass cover 23 which is detachably secured to the base 21 in any conventional manner. A gasket G is interposed between the glass cover and the base.

In order to couple the electromagnet windings to an external electrical circuit terminal means are provided which pass through the base 21. In the embodiment of FIG. 1 the terminal means takes the form of contact blades 25 which have portions extending into the casing for connection to the winding means and portions accessible externally of the casing.

Connections to the contact blades 25 from an external circuit are established by a conventional socket which includes a cup-shaped enclosure 27 having its open end closed by the base 21. The enclosure 27 carries insulating blocks 29 on which contact jaws 31 are mounted. These contact jaws are positioned to receive detachably the contact blades 25 when the watthour meter 1 and its casing are moved to the right as viewed in FIG. 1 into the mounted position therein illustrated.

Each of the contact jaws 31 has a suitable terminal 32 connected thereto for receiving the conductor of an external circuit with which the watthour meter is to be associated. The conductors enter and leave the sockets through conduit 35 as shown in FIG. 1.

It is common practice to employ a ground conductor 36 which is attached to a ground terminal 36a in the socket. In a three-wire system the ground conductor is not connected to the meter. It may be located about one and one-half inches from the rear of the meter base.

The structure of FIG. 1, as thus far described, is conventional in the art and is described in greater detail in a publication entitled "Descriptive Bulletin 42–101," dated May 1960, and published by the Westinghouse Electric Corporation, Raleigh Plant, Raleigh, N.C.

In accordance with the invention the container formed by the base 21 and the cover 23 is sealed against entry of deleterious material. The gasket G is preferably of a resilient material, such as an elastomer, for the purpose of establishing a seal between the base and the cover. It will be understood that the base may be detachably secured to the cover in a conventional manner.

In order to prevent the entry of deleterious material through spaces present between the contact blades and the base 21 the contact blades may be molded into the material of the base to provide a gap-free construction or cement may be employed to fill any spaces left between the contact blades and the base. Preferably, the contact blades are substantially sealed to the base 21 in the manner shown in FIG. 2.

Figure 2:
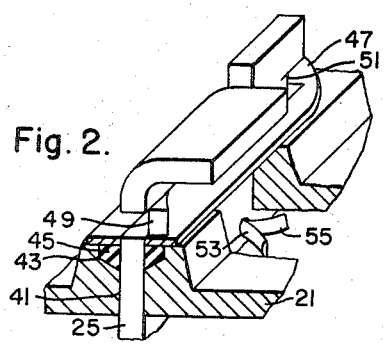
FIG. 2 is a detail view in perspective showing a suitable mounting for contact blades employed in the assembly of FIG. 1.
Figure 3:
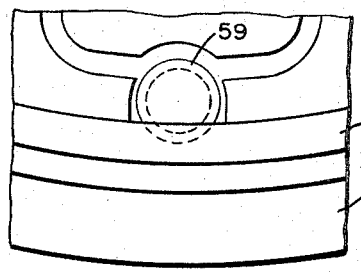
FIG. 3 is a view in front elevation of a portion of the base employed in the meter assembly of FIG. 1.

As shown in FIG. 2, the base 21 is provided with a slot 41 for snugly receiving each of the contact blades. The base is provided with a trough 43 completely surrounding the upper end of the contact blade, as viewed in FIG. 2. The trough is filled with a gasket 45 which is constructed of a resilient material such as rubber. In its relaxed condition the gasket extends slightly above the base 21 as viewed in FIG. 2. A washer 47 has a slot for snugly receiving the contact blade 41. The washer may be constructed of a suitable material, such as stainless steel. It will be noted that fingers 49 and 51 are formed by slitting the contact blade and are bent to overlie portions of the washer 47. These fingers limit motion of the washer in an upward direction, as viewed in FIG. 2, relative to the contact blade.

The gasket 45 is held compressed between the washer 47 and the base 21 in any suitable manner. In the embodiment of FIG. 2 the contact blade is provided with a hole 53 for reception of a cotter pin 55. When the contact blade 25 is forced downwardly, as viewed in FIG. 2, to compress the gasket 45 the hole 53 extends just far enough beyond the base 21 to receive the cotter pin 55. Consequently, after insertion of the cotter pin and release of the contact blade 25 the gasket 45 remains under compression to effect a substantial seal between the contact blade and the base.

In order to permit breathing of the container a vent 57 is provided which extends through the base 21 between the interior of the container and the interior of the associated socket. The vent is located adjacent the lowest point of the container in order to facilitate drainage of water away from the interior of the container. It has been proposed that this vent be provided with a screen. For example, a screen constructed of aluminum wire having a diameter of 0.01 inch has been employed wherein the screen has a mesh represented by 40 wires per inch in one direction and 36 wires per inch in a direction transverse to the first direction. Such a screen does not prevent the entry into the container of dust and insects.

In accordance with the invention the vent 57 is sealed by a material 59 which is impermeable to deleterious material such as dust and insects normally encountered by the watthour meter assembly, but which is permeable to air and water. Preferably, the material is immune to chemicals or reagents which may be present adjacent thereto. In a preferred embodiment of the invention, the material acts as a wick to conduct water across the base 21 by capillary action or by transfer of the water to a region of lower partial pressure defined by the socket and associated conduit.

Asbestos has been employed successfully as the material, however, asbestos is subject to the disadvantage that it is a source of lint.

In a preferred embodiment of the invention, a porous ceramic is employed as the material 59. In particular, silica has been found to possess excellent properties when employed as the material 59. Porous silica filters are available on the market and are employed in chemical plants for filtering purposes. It is conventional to classify such silica filters by the diameter of the pores or filtering passages which it contains. For example, a 20 micron silica filter has pores or passages which are too small to pass dust having a diameter greater than 20 microns. Filters which do not exceed a rating of 120 microns have proved to be satisfactory for most applications, and a 20 micron silica filter has been tested with good results.

If desired, the material 59 may be cemented or otherwise secured in the vent 57.

Preferably, the material 59 is in the form of a cylindrical disc or silica which is snugly received within a cup-shaped opening in the base 21 which opens into the interior of the container. The end wall of the cup-shaped opening is provided with a hole 61 which is smaller in diameter than the diameter of the disc 59 and which opens into the socket.

By inspection of FIG. 1, it will be noted that a portion of the gasket G overlies the disc 59. The gasket suffices to retain the disc 59 in its mounted position as shown in FIG. 1.

Tests have demonstrated that the disc 59 is extremely effective in sealing the container against dust and insects. At the same time it provides a positive path which permits breathing of the container and which provides for discharge of water from the container.

Although the invention has been described with reference to certain specific embodiments thereof, numerous modifications falling within the spirit and scope of the invention are possible.

I claim as my invention:

1. In an electrical measuring device, an induction electro-responsive measuring unit, a container for said measuring unit, said container comprising an enclosure for said measuring unit which, is completely sealed against entry of particles having a transverse dimension larger than 120 microns, said container having a portion at the lowest part of the enclosure for transmitting moisture from the interior to the exterior of the enclosure, said portion having a moisture inlet surface extending vertically within the enclosure.

2. A device as claimed in claim 1 wherein said container is sealed against entry of particles larger in size than 20 microns, said container including a wall extending substantially from the lowest part of the enclosure to a higher position, said wall having a vent extending horizontally through said wall from the interior to the exterior of the enclosure adjacent the lowest part of the enclosure, said portion comprising a moisture-transmitting, particle-blocking, capillary-passage material for permitting breathing for the container, said material extending across said vent for preventing passage therethrough of particles larger than the capillary passages.

3. A device as claimed in claim 2 wherein said container comprises a cup-shaped cover having a horizontal axis, said wall comprising a vertically-extending base of insulating material substantially closing the open mouth of the cover, and terminal means extending through, and sealed to, said base, the capillary-passage material being a porous ceramic.

4. A device as claimed in claim 3 wherein the capillary-passage material in the vent is in the form of a plug having a vertically-extending entrance surface, said vent comprises an opening sufficient in size to receive the plug when inserted in a first direction from the cover side of the base, said opening having a constricted portion preventing movement of the plug in the first direction completely through the base, wherein said container includes a gasket interposed between the cover and the base, said gasket extending over at least part of the vent to block movement of the plug out of said opening in a secured direction opposite to the first direction.

5. A device as claimed in claim 3 wherein said measuring unit comprises an induction watthour meter having operating windings connected to said terminal means for energization therethrough, said capillary passage material being located within the insulating material of said base.

References Cited

UNITED STATES PATENTS

| | | | |
|---|---|---|---|
| 2,323,146 | 6/1943 | Manney | 310—88 |
| 2,470,050 | 5/1949 | Petterson | 310—88 |
| 2,476,909 | 7/1949 | Ratz | 324—156 |
| 2,790,951 | 4/1957 | Holtz | 324—156 |
| 2,970,265 | 1/1961 | Lipscomb | 324—137 X |

WALTER L. CARLSON, *Primary Examiner.*

RUDOLPH V. ROLINEC, *Examiner.*